United States Patent
Horning, Jr. et al.

(10) Patent No.: US 9,918,432 B2
(45) Date of Patent: Mar. 20, 2018

(54) CORN PROCESSING ROLL WITH CHEVRON GROOVES

(71) Applicant: Horning Manufacturing, LLC, New Holland, PA (US)

(72) Inventors: Leon H. Horning, Jr., Ephrata, PA (US); Leon Z. Horning, East Earl, PA (US); Matthew H. Horning, Pembroke, KY (US)

(73) Assignee: Horning Manufacturing, LLC, East Earl, PA (US)

( * ) Notice: Subject to any disclaimer, the term of this patent is extended or adjusted under 35 U.S.C. 154(b) by 57 days.

(21) Appl. No.: 15/195,595

(22) Filed: Jun. 28, 2016

(65) Prior Publication Data
US 2017/0000031 A1  Jan. 5, 2017

Related U.S. Application Data

(60) Provisional application No. 62/188,322, filed on Jul. 2, 2015.

(51) Int. Cl.
| | |
|---|---|
| *A01D 82/02* | (2006.01) |
| *B02C 4/30* | (2006.01) |
| *A01D 82/00* | (2006.01) |
| *B02C 4/08* | (2006.01) |
| *A01D 43/10* | (2006.01) |

(52) U.S. Cl.
CPC ............ *A01D 82/02* (2013.01); *A01D 43/10* (2013.01); *A01D 82/00* (2013.01); *B02C 4/08* (2013.01); *B02C 4/30* (2013.01)

(58) Field of Classification Search
CPC ...... A01D 43/006; A01D 43/10; A01D 82/00; A01D 82/02; B02C 4/08; B02C 4/30
See application file for complete search history.

(56) References Cited

U.S. PATENT DOCUMENTS

| | | | | |
|---|---|---|---|---|
| 2,921,426 | A * | 1/1960 | Heth | A01D 82/00 100/162 B |
| 4,150,524 | A * | 4/1979 | Sawyer | A01D 82/02 56/1 |
| 6,360,515 | B1 * | 3/2002 | Cook | A01D 82/00 56/14.1 |
| 6,499,283 | B1 * | 12/2002 | Cook | A01D 82/02 56/16.4 B |
| 7,458,198 | B2 * | 12/2008 | Eubanks | A01D 82/02 56/16.4 R |
| 8,480,019 | B1 | 7/2013 | Scherer | |

* cited by examiner

*Primary Examiner* — Alicia Torres
(74) *Attorney, Agent, or Firm* — Miller Law Group, PLLC (57) ABSTRACT

Crop processing rolls are provided for operative use in forage harvesters wherein the crop processing rolls are formed with spiraled grooves that are oriented in opposing slopes extending from the opposite ends of the crop processing roll toward the center of the roll. The formation of these spiraled grooves defines teeth from the ridges created with the formation of horizontal grooves into the circumferential surface of the crop processing roll. In one configuration, the spiraled grooves meet at the center of the crop processing roll in a V-shaped intersection to provide a chevron shape to the spiraled grooves. In a second configuration, the spiraled grooves do not intersect at the center and form a semi-chevron pattern that does not form a short tooth that the chevron configuration creates at the V-shaped intersection.

14 Claims, 6 Drawing Sheets

CORN PROCESSING ROLL WITH CHEVRON GROOVES

CROSS-REFERENCE TO RELATED APPLICATIONS

This application claims domestic priority on U.S. Provisional Patent Application Ser. No. 62/188,322, filed on Jul. 2, 2015, the content of which is incorporated herein by reference.

FIELD OF THE INVENTION

This invention deals generally with forage harvesters, and more specifically with a processing roll that yields higher flow-through capacity than is presently available in the corn kernel cracking section of a forage harvester.

BACKGROUND OF THE INVENTION

Forage harvesters are mobile machines designed to chop whole corn plants into small pieces to be fed to cattle and other livestock. Conventional forage harvesters are manufactured with a cutterhead formed with spiraled knives and rotate about a horizontal axis to chop forage material, such as corn or alfalfa, into small pieces that are typically fermented through a process referred to as ensilage. The forage harvester first severs the plants from the ground and conveys the severed plants into the path of the rotating cutterhead. By manipulating the speed at which the crop material is conveyed and the speed at which the cutterhead is rotated, the length of the small pieces of crop material can be varied as desired by the operator.

Forage harvesters can also utilize a pair of counter rotating processing rolls which rotate about parallel axes and define a gap therebetween. The crop material can pass through this gap after being chopped into small pieces by the rotating cutterhead to crack the kernels of corn that may be in the flow of crop material exiting the cutterhead. By cracking the corn kernels, livestock, particularly dairy cattle, have improved digestibility, and produced more and higher quality milk. The crop material discharged from between the corn processing rolls is fed into a blower that moves the chopped crop material through a discharge chute to be deposited into a container, such as a forage wagon that s typically connected to the forage harvester and trails behind the harvester to receive the chopped crop material. Once filled, the forage wagon is disconnected and taken to a storage facility where the forage wagon s emptied and returned to the forage harvester for refilling.

Conventional corn processing rolls are constructed with longitudinally extending grooves machined into the rolls, which are then reduced to individual teeth by a continuous spiral groove that is machined around the circumference of the roll to form peaks and valleys along the longitudinal, axial length of the outer circumferential surface of the corn processing rolls. In cross-section, these peaks and valleys can resemble saw teeth.

Due to the high cost of forage harvesters and limited harvesting time when the crop is ready to be harvested, harvesting speed is very critical to a successful operation of the forage harvester. One of the known limitations on the harvesting speed in forage harvester configurations that utilize corn processing rolls is the operating speed of the corn processing rolls. With increasing harvesting speeds being demanded of the operation of forage harvesters, the corn processing rolls require advance design to prevent the corn processing rolls from being a bottleneck in the operation of a forage harvester.

Known prior art machines have attempted to overcome this limitation by running the corn processing rolls at higher speeds, but have had limited success because of centrifugal force limits on the rolls and speed limitations on the bearings rotatably supporting the corn processing rolls. Another known prior art approach to increasing operating speeds approach has been to space the peaks on the roll surfaces farther apart, but this technique results in some kernels passing between the corn processing rolls without being cracked.

A representative example of the design of corn processing rolls for use in a forage harvester is disclosed in U.S. Pat. No. 8,480,019, granted on Jul. 9, 2013, to Bob A. Scherer, et al, in which the corn processing roll is formed with a series of longitudinally spaced grooves that define elongated axially aligned ridges between the longitudinal grooves. The corn processing roll then goes through a subsequent manufacturing process to form a spiraled groove extending circumferentially around the corn processing roll, as is best seen in FIG. 4. The longitudinal and spiral grooves disclosed in the '019 patent are formed with a v-shaped bit that creates corresponding V-shaped grooves, resulting in discrete teeth around the circumference of the corn processing roll that have a larger base than the top portion of the respective tooth, as is best seen in FIG. 5 of the '019 patent.

Corn processing rolls have been manufactured by Horning Manufacturing, LLC, for many years in a variety of configurations, including corn processing rolls with longitudinal and spiral grooves similar to that of the '019 patent, but formed with a rounded bit that creates vertical sides of the respective teeth around the circumference of the corn processing rolls. Certain configurations of the Horning Manufacturing, LLC, corn processing rolls have also been operated at differential speeds of rotation to provide a more aggressive shredding of the crop material being chopped by the forage harvester These corn processing rolls, such as is represented in the '019 patent, formed with a spiral groove around the circumference, irrespective of the shape of the grooves, have a tendency to urge the movement of the crop material passing between the crop processing rolls toward the end of the corn processing rolls that faces the leading slope of the spiral groove. In other words, the spiral fighting of the circumferential groove pushes crop material toward the leading end of the rolls. While the leading slope of the circumferential spiral is not very aggressive, there has been sufficient movement of the crop material toward the leading end to cause more failures for the hearings supporting the rotation of the corn processing rolls at the leading end than occur at the trailing end.

It would be desirable to provide a configuration of corn processing rolls for use in forage harvesters that would facilitate the high speed harvesting operation of forage harvesters without sacrificing quality of operation. It would also be desirable to provide a configuration for corn processing rolls that would not overly stress the bearings on one end of the corn processing roll as compared with the opposing end of the corn processing roll.

SUMMARY OF THE INVENTION

It is an object of this invention to overcome the disadvantage of the prior art by providing corn processing rolls for use in forage harvesters and having a chevron groove pattern formed into the processing rolls.

It is another object of this invention to provide corn processor rolls that have grooves formed therein and arranged in a chevron pattern.

It is a feature of this invention that the rotation of the crop processing rolls urges movement of the crop material being processed away from the bearings at the ends of the crop processing rolls.

It is an advantage of this invention that the bearings for the crop processing rolls can have a longer operating life.

It is another advantage of this invention that the opposing bearings rotatably supporting the crop processing rolls should have substantially equal operating lives without one bearing prematurely failing relative to the opposing bearing.

It is another feature of this invention that the grooves cut into crop processing rolls are sloped in opposing spiraled directions to meet at a V-shaped intersection at the center of the crop processing roll.

It is still another advantage of this invention that the crop processing rolls provide effective operation without requiring the operating speed of rotation of the crop processing rolls to be increased.

It is still another object of this invention to provide a crop processing roll with a semi-chevron groove pattern that has opposing spiraled slopes to the grooves formed in the surface of the crop processing roll extending from the opposing ends of the crop processing rolls without having the grooves intersect at the center of the crop processing roll.

It is still another feature of this invention that the semi-chevron configuration of circumferential grooves does not create and leave a short tooth formed from the ridge at the intersection of the oppositely oriented circumferential grooves.

It is yet another object of this invention to provide a crop processing roll for use in forage harvesters to process crop material, wherein the crop processing toll is durable in construction, inexpensive of manufacture, carefree of maintenance, facile in assemblage, and simple and effective in use.

These and other objects, features and advantages are accomplished according to the instant invention by providing crop processing rolls for operative use in forage harvesters wherein the crop processing rolls are formed with spiraled grooves that are oriented in opposing slopes extending from the opposite ends of the crop processing roll toward the center of the roll. The formation of these spiraled grooves defines teeth from the ridges created with the formation of horizontal grooves into the circumferential surface of the crop processing roll. In one configuration, the spiraled grooves meet at the center of the crop processing roll in a V-shaped intersection to provide a chevron shape to the spiraled grooves. In a second configuration, the spiraled grooves do not intersect at the center and form a semi-chevron pattern that does not form a short tooth that the chevron configuration creates at the V-shaped intersection.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

DETAILED DESCRIPTION OF THE PREFERRED EMBODIMENT

Referring to the drawings, corn processing rolls incorporating the principles of the instant invention can best be seen. A conventional forage harvester 10, as depicted schematically in FIG. 1, includes a header 11 at the forward end thereof to collect crop material from the surface of the ground G, typically by severing the crop adjacent to the ground G and conveying the severed crop material rearwardly for further harvesting. The severed crop material is typically delivered to a feed roll mechanism 12 that orients the crop material as a flat mat that is advanced toward a rotating cutterhead 15 having knives 16 mounted thereon to sever the crop material into small pieces as the mat of crop material passes over a shear bar 13. The rapidly rotating cutterhead 15 rotating within a housing 17 propels the severed crop material pieces to the corn processing roll assembly 20 having a pair of corn processing rolls 22 separated by a gap through which the propelled comminuted crop material pieces pass.

Figure 1:
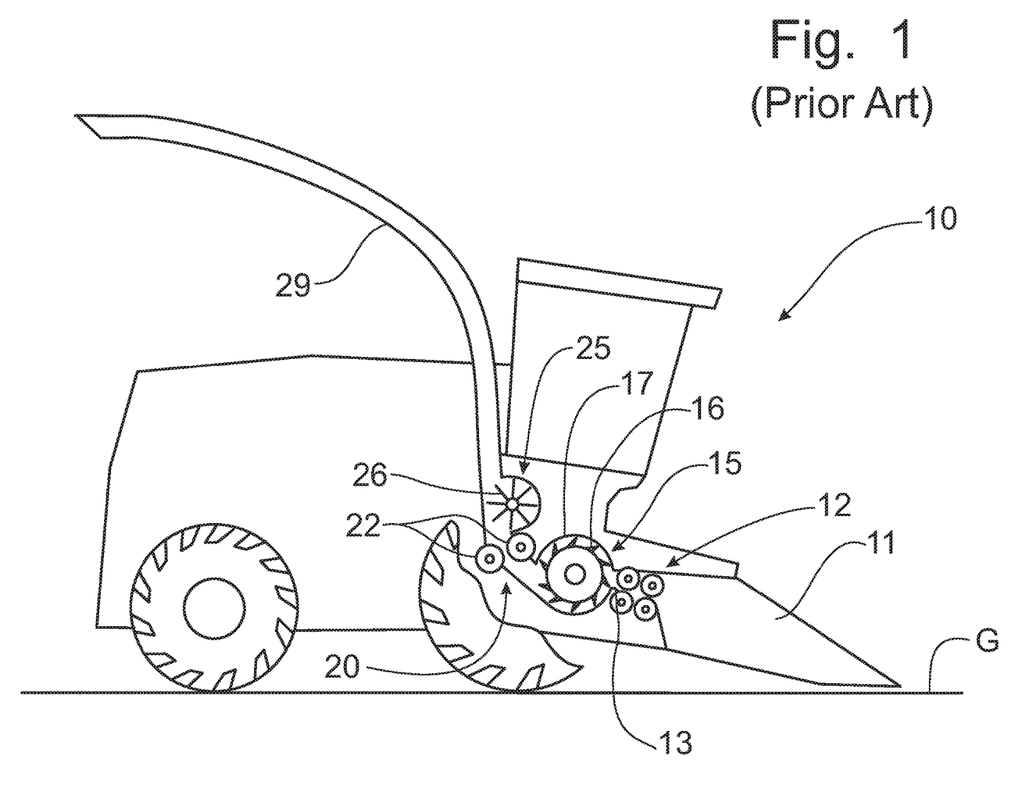
FIG. 1 is a schematic partial cross-sectional view of a conventional forage harvester having a corn processing unit installed between the cutterhead and the blower.

One of the corn processing rolls 22 is normally biased toward the opposing corn processing roll 22 by springs (not shown) that keep the spacing minimized to provide the operation of cracking the kernels of corn within the pieces of crop material passing through the corn processing roll assembly 20. Furthermore, the respective rolls 22 are normally driven at differential speeds to shred the crop material passing between the two rolls 22. The rotating corn processing roll assembly 20 in turn propels the processed pieces of crop material upwardly into a blower 25 having vanes 26 that project the chopped and processed crop material through a discharge chute 29 into a trailing forage wagon (not shown) that collects the discharged crop material for transport to a storage facility (not shown).

Figure 2A:
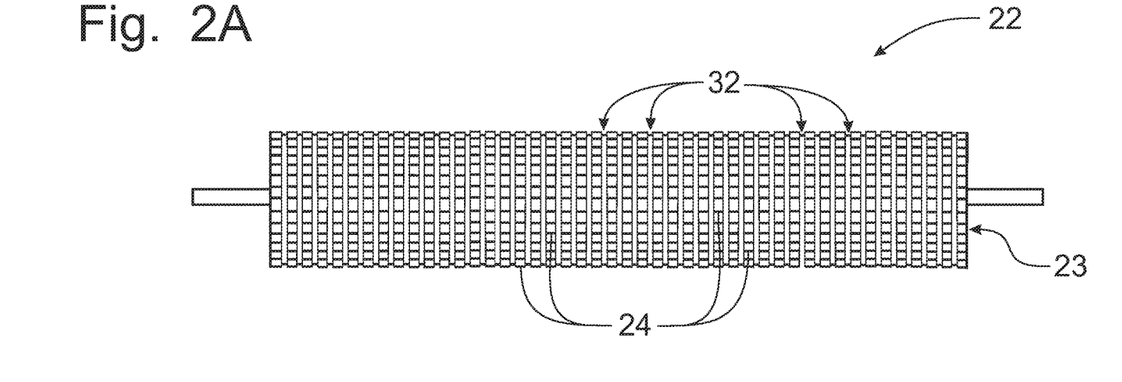
FIG. 2A is an elevational view of a first embodiment of a corn processing roll incorporating the principles of the instant invention.
Figure 2B:
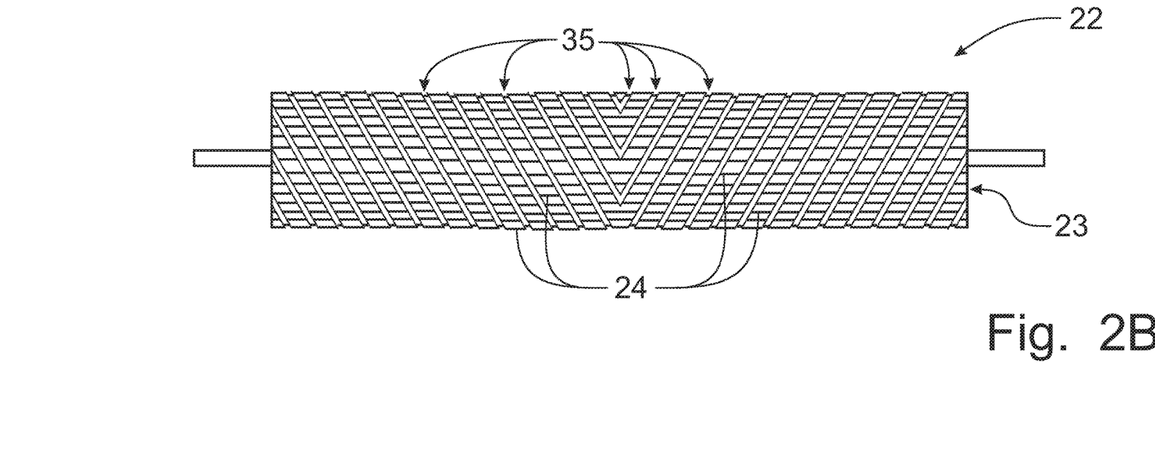
FIG. 2B is an elevational view of a second embodiment of a corn processing roll incorporating the principles of the instant invention.

The present invention increases the quantity of chopped corn plants, particularly with respect to the corn kernels found in the supply of chopped corn plants, that the corn processing rolls provide without requiring the speed of rotation of the corn processing rolls be increased. This increase in productivity is accomplished by placing multiple notches along the length of the longitudinally oriented peaks formed along the axial length of the outer surface of the corn processing rolls 22. Furthermore, by use of the instant invention, the preferred spacing between the longitudinal peaks can be maintained and multiple longitudinal teeth are created by the placement of the circumferential grooves around the corn processing rolls to intersect the longitudinal peaks, as is best seen in FIGS. 2A and 2B. Since the overall diameter of the corn processing rolls are not increased, and since the corn processing rolls can be operated at the conventional speed of the previous corn processing rolls, the rolls 22 formed according to the instant invention can be retrofitted into existing machines to increase the capacity thereof by merely replacing the previous corn processing rolls with rolls manufactured according to the principles of the instant invention.

Figure 2C:
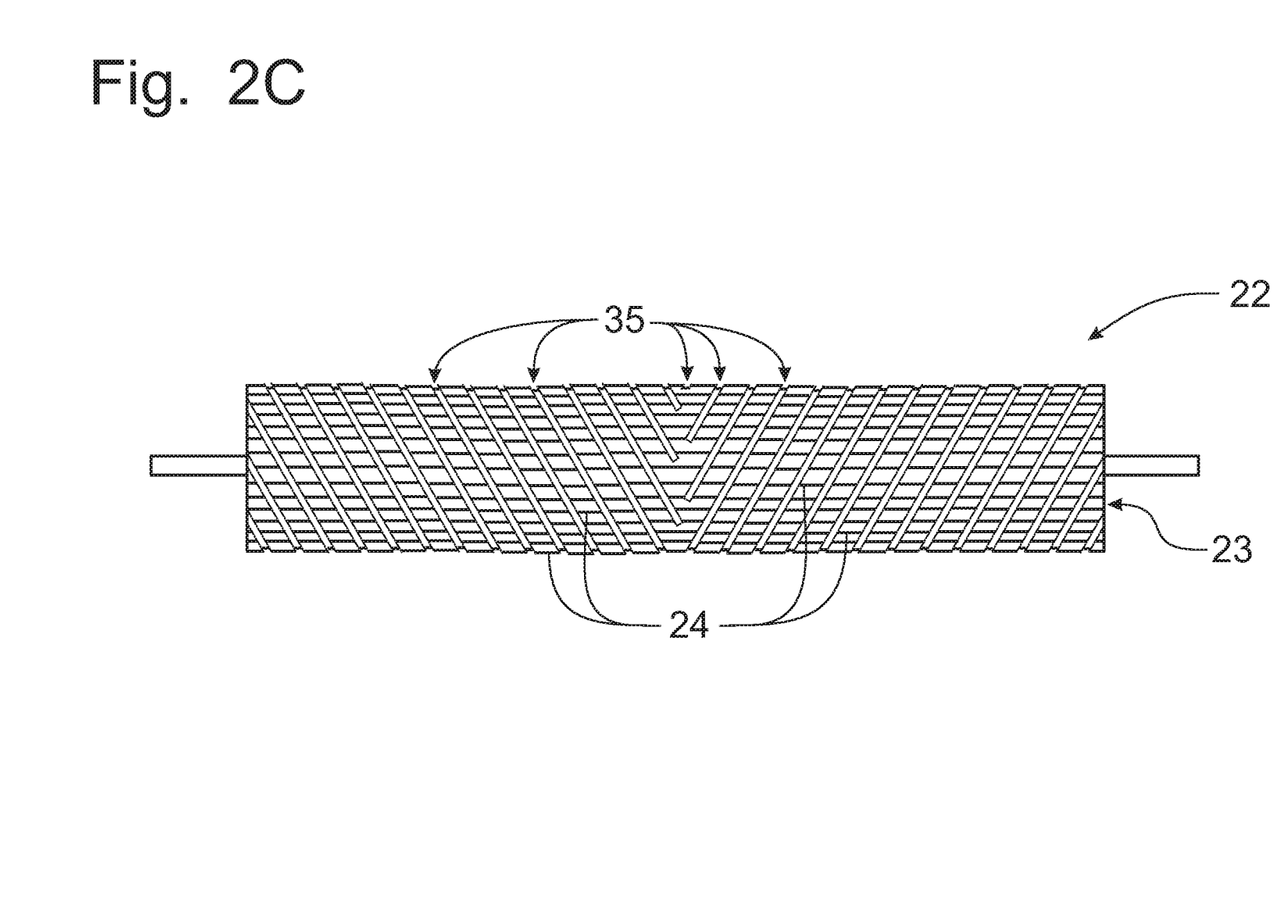
FIG. 2C is an elevational view of a third embodiment of a corn processing roll incorporating the principles of the instant invention.

Three configurations of corn processing rolls 22 according to the principles of the instant invention are depicted in FIGS. 2A-2C. The intent of these corn processing rolls 22 is to provide increased capacity rolls 22 without utilizing a spiral circumferential groove that will shift crop material laterally as the crop material is passed between the rotating corn processing rolls 22. The first embodiment of the processing roll 22 shown in FIG. 2A is formed with the longitudinally extending grooves 23 running parallel with the axis of rotation of the processing roll 22, but a series of parallel spaced-apart circumferential grooves 32 divide the ridges 24 formed by the longitudinal grooves 23 into discrete teeth. With the use of the parallel grooves 32 forming spaced-apart rings around the outer circumference of the processing roll 22, the circumferential grooves 32 do not urge the movement of crop material passing between the processing rolls 22 to move toward one of the bearings and cause an overloading thereof.

Figure 3:
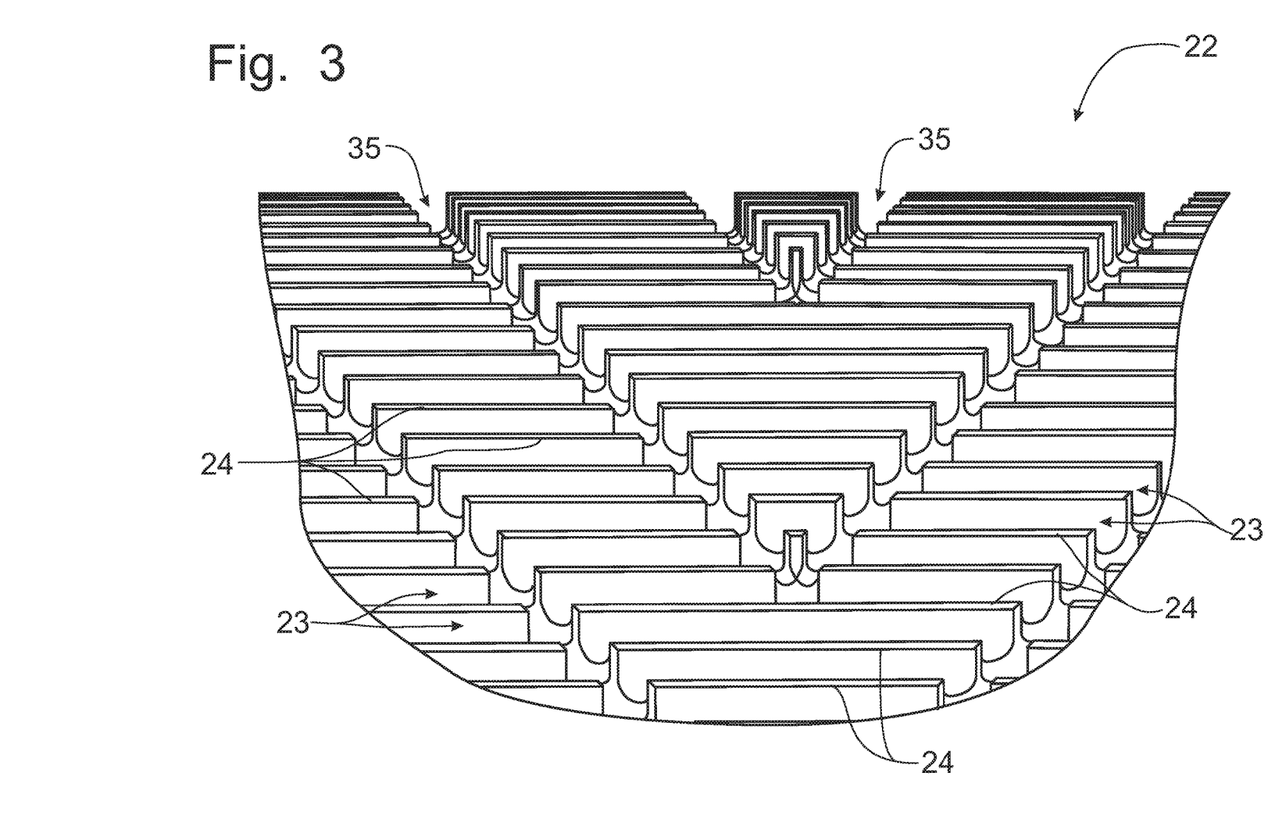
FIG. 3 is an enlarged perspective view of a central portion of the processing roll incorporating the configuration of the second embodiment of the instant invention as shown in FIG. 2B.

The processing roll 22 incorporating the configuration of the second embodiment depicted in FIG. 2B and in the enlarged portion of the corresponding processing roll 22 shown in FIG. 3, is also formed with the longitudinally extending grooves 23 running parallel with the axis of rotation of the processing roll 22, but is intersected with a spiraled circumferential groove 35 formed in the shape of a chevron. In this second embodiment configuration, the circumferential groove 35 spirals in opposing directions from the opposing ends of the processing roll 22, meeting at the center in a V-shape, thus form the chevron configuration. As opposed to a continuous spiral circumferential groove extending from one end of the processing roll 22 to the other, as is known in the prior art, which causes the crop material being processed between the processing rolls to move toward one end of the processing roll 22, the chevron design will urge movement of the crop material being processed away from the opposing ends of the processing roll 22 and toward the center of the roll 22. Accordingly, with the chevron groove 35 configuration, as with the parallel circumferential groove 32 configuration, the bearings at one end of the processing roll 22 is not consistently overloaded.

Figure 3A:
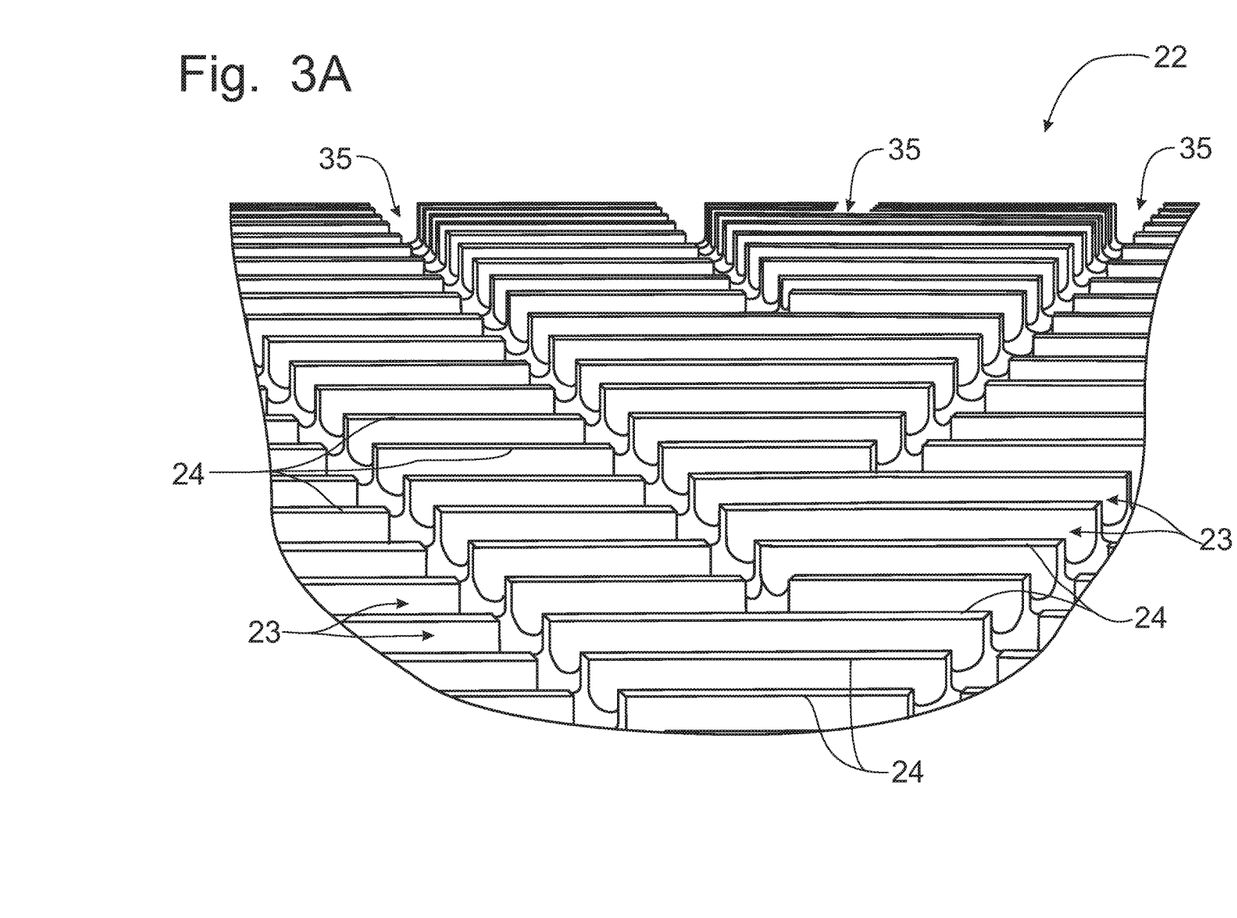
FIG. 3A is an enlarged perspective view of a central portion of the processing roll incorporating the configuration of the third embodiment of the instant invention as shown in FIG. 2C.

The configuration of the third embodiment of the instant invention as shown in FIG. 2C and in the enlarged portion of the corresponding processing roll shown in FIG. 3A, is similar to the second embodiment noted above, but leaves a gap between the oppositely slanted circumferential grooves 35. This semi-chevron configuration of circumferential grooves 35 does not create and leave a short tooth formed from the ridge 24 at the intersection of the oppositely oriented circumferential grooves 35. In other words, the "V" of the chevron grooves 35 in the second embodiment depicted in FIG. 2B will leave a short portion of the ridge 24 at the point of the "V". By stopping the circumferential grooves 35 prior to actually intersecting the oppositely winding circumferential groove 35, only longer teeth are created from the ridges 24, as compared to the length of the ridge segments 24 between parallel circumferential grooves 35, rather than forming shorter ridge segments (teeth).

Further, one skilled in the art will recognize that the chevron shape of the circumferentially extending grooves 35 as shown in either FIG. 2B or FIG. 2C, will either urge crop toward the center of the processing roll 22, or outwardly toward both opposing ends of the processing roll 22, depending on which direction the processing roll 22 is rotated. In either direction of rotation, i.e. whether the crop material is urged toward the center of the roll 22 or toward the opposing ends of the roll 22, the opposing bearings supporting the processing roll 22 for rotation about the axis of rotation will be equally loaded, and will not result in a premature failure of one of the bearings over the other.

Figure 4A:
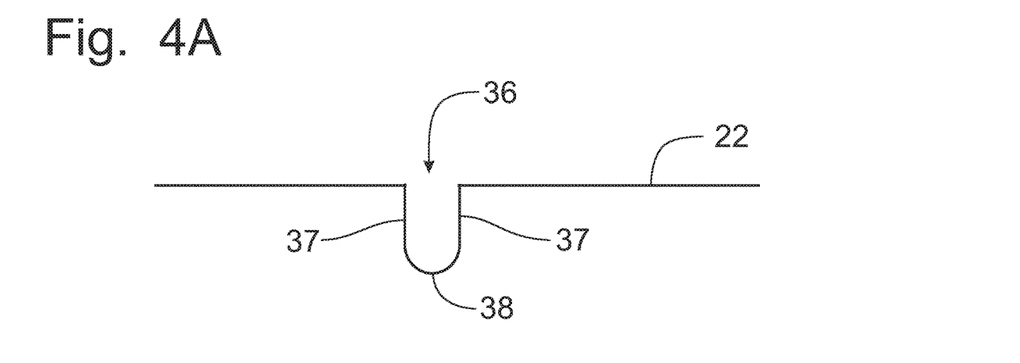
FIG. 4A is a schematic view of a first groove profile embodiment.
Figure 4B:
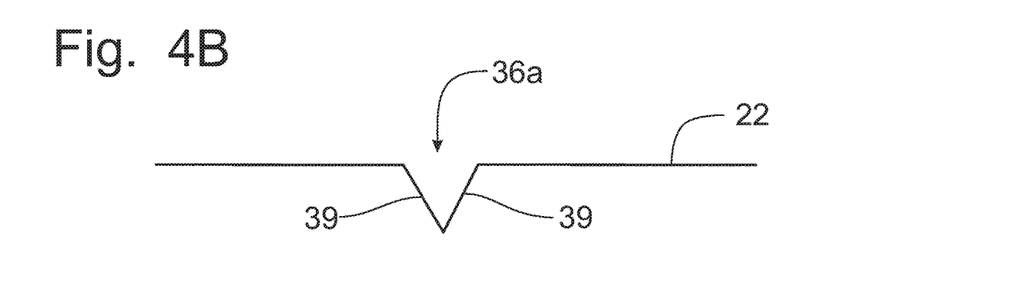
FIG. 4B is a schematic view of a second groove profile embodiment.
Figure 4C:
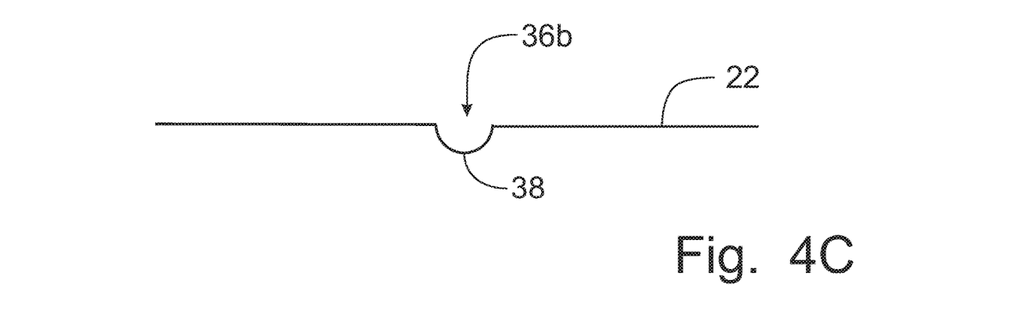
FIG. 4C is a schematic view of a third groove profile embodiment.

FIGS. 4A-4C are schematic diagrams of several alternate embodiments of shapes for grooves forming the ridges of kernel processing rolls 22 of the invention. FIG. 4A depicts the preferred embodiment of the shape of the grooves 23, 32, 35 created by the machining of the processing rolls 22, formed with a bit that has parallel sides and a rounded tip, resulting in a groove 36 having generally vertical, parallel sides 37 joined by concave bottom 38 portion. FIG. 4B shows a second embodiment of the grooves 23, 32, 35 formed by a V-shaped bit resulting in sloping sides 39 that form a corresponding V-shape in the groove 36a. The third embodiment shown in FIG. 4C shows a groove 36b having a shape similar to that of FIG. 4A, but with only the rounded tip of the bit being engaged with the processing roll 22 to form just the concave bottom portion 38.

One skilled in the art will understand that many other groove shapes can be utilized in forming both the longitudinally extending grooves 23 and the circumferential grooves 32, 35, so long as the shape of the grooves, the spacing of the grooves and the configuration of the groove pattern does not result in corn kernels passing through the processing rolls 22 without being cracked. Accordingly, the configuration of the grooves 23, 32, 35 must meet the basic requirement that the groove size and shape must be such that the grooves prevent corn kernels from being lodged within the groove, and not allow corn kernels from passing between the processing rolls 22 without being cracked.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:
1. A crop processing roll for use in a forage harvester to process crop material comminuted by the operation of the forage harvester before being discharged from the forage harvester, comprising:
    an elongated cylindrical body adapted for rotation about an axis of rotation and having formed therein a plurality of longitudinally extending grooves oriented parallel with the axis of rotation and being formed in the outer circumference of the cylindrical body, said longitudi- nally extending grooves forming ridges between said longitudinally extending grooves; and circumferentially extending grooves formed in the outer circumference of the elongated cylindrical body and oriented to intersect said longitudinally extending grooves to pass through said ridges to break said ridges into discrete teeth, said circumferentially extending grooves being configured to prevent crop material engaged by said processing roll from moving toward only one end of said processing roll, said circumferentially extending grooves being formed in a spiraled configuration extending from the respective ends of the crop processing roll in opposing directions from the opposing ends of the processing roll.

2. The crop processing roll of claim 1 wherein the discrete teeth formed by the intersection of the circumferentially extending grooves with the ridges formed by the longitudinally extending grooves have different longitudinal lengths depending on the location of the respective teeth on the processing roll.

3. The crop processing roll of claim 2 wherein the shape of the longitudinal and circumferentially extending grooves has vertical sides and a rounded bottom portion.

4. The crop processing roll of claim 1 wherein the oppositely oriented circumferentially extending grooves intersect at the center of the cylindrical body to form a V-shaped chevron configuration.

5. The crop processing roll of claim 1 wherein the oppositely oriented circumferentially extending grooves do not intersect at the center of the cylindrical body, leaving a gap between the oppositely oriented circumferentially extending grooves.

6. A corn processing roll for use in a forage harvester to process corn kernels passing through said forage harvester before being discharged from the forage harvester, comprising:

an elongated cylindrical body adapted for rotation about an axis of rotation and having formed therein a plurality of longitudinally extending grooves oriented parallel with the axis of rotation and being formed in an outer circumference of the cylindrical body, said longitudinally extending grooves forming ridges between said longitudinally extending grooves; and circumferentially extending grooves formed in the outer circumference of the elongated cylindrical body and oriented to intersect said longitudinally extending grooves to pass through said ridges to break said ridges into discrete teeth, said circumferentially extending grooves being formed in a spiraled configuration extending from respective ends of the crop processing roll in opposing directions from the opposing ends of the processing roll such that the circumferentially extending grooves originating at one end have an opposite slope with respect to the circumferentially extending grooves originating at the opposing end of the processing roll.

7. The corn processing roll of claim 6 wherein the discrete teeth formed by the intersection of the circumferentially extending grooves with the ridges formed by the longitudinally extending grooves have different longitudinal lengths depending on the location of the respective teeth on the processing roll.

8. The corn processing roll of claim 6 wherein the shape of the longitudinal and circumferentially extending grooves has vertical sides and a rounded bottom portion.

9. The corn processing roll of claim 6 wherein the oppositely oriented circumferentially extending grooves intersect at the longitudinal center of the cylindrical body to form a V-shaped chevron configuration.

10. The corn processing roll of claim 6 wherein the oppositely oriented circumferentially extending grooves do not intersect at the center of the cylindrical body, leaving a gap between the oppositely oriented circumferentially extending grooves.

11. A crop processer for use in a forage harvester to process crop material comminuted by the operation of a forage harvester before being discharged from the forage harvester, comprising:

a pair of crop processing rolls mounted for rotation about respective parallel axes of rotation, each said crop processing roll having an outer circumference with said crop processing rolls being mounted so that the crop material comminuted by the operation of the forage harvester passes between the two crop processing rolls, said crop processing rolls being driven at differential speeds to enhance the processing of the crop material passing between the crop processing rolls;

each said crop processing roll being formed as an elongated cylindrical body adapted for rotation about the corresponding axis of rotation and having formed therein a plurality of longitudinally extending grooves oriented parallel with the axis of rotation and being formed in the outer circumference of the cylindrical body, said longitudinally extending grooves forming ridges between said longitudinally extending grooves; and each said crop processing roll further having circumferentially extending grooves formed in the outer circumference of the elongated cylindrical body and oriented to intersect said longitudinally extending grooves to pass through said ridges to break said ridges into discrete teeth, said circumferentially extending grooves being configured to prevent crop material engaged by said processing roll from moving toward only one end of said processing roll, said circumferentially extending grooves being formed in a spiraled configuration extending from the respective ends of the crop processing roll in opposing directions from the opposing ends of the crop processing roll such that the circumferentially extending grooves originating at one end have an opposite slope with respect to the circumferentially extending grooves originating at the opposing end of the crop processing roll.

12. The crop processor of claim 11 wherein the discrete teeth formed by the intersection of the circumferentially extending grooves with the ridges formed by the longitudinally extending grooves have different longitudinal lengths depending on the location of the respective teeth on the processing roll.

13. The crop processor of claim 11 wherein the oppositely oriented circumferentially extending grooves intersect at the center of the cylindrical body to form a V-shaped chevron configuration.

14. The crop processor of claim 11 wherein the oppositely oriented circumferentially extending grooves do not intersect at the center of the cylindrical body, leaving a gap between the oppositely oriented circumferentially extending grooves.

* * * * *